(12) United States Patent
Ohno et al.

(10) Patent No.: US 11,084,450 B2
(45) Date of Patent: Aug. 10, 2021

(54) CURTAIN AIRBAG DEVICE FOR VEHICLE

(71) Applicant: TOYOTA JIDOSHA KABUSHIKI KAISHA, Toyota (JP)

(72) Inventors: Mitsuyoshi Ohno, Miyoshi (JP); Masaaki Okuhara, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 16/551,801

(22) Filed: Aug. 27, 2019

(65) Prior Publication Data

US 2020/0108791 A1 Apr. 9, 2020

(30) Foreign Application Priority Data

Oct. 3, 2018 (JP) .............................. JP2018-188244

(51) Int. Cl.
*B60R 21/232* (2011.01)
*B60R 21/237* (2006.01)
*B60R 21/213* (2011.01)
*B60R 21/16* (2006.01)

(52) U.S. Cl.
CPC .......... *B60R 21/232* (2013.01); *B60R 21/213* (2013.01); *B60R 21/237* (2013.01); *B60R 2021/161* (2013.01)

(58) Field of Classification Search
CPC ................ B60R 21/213; B60R 21/232; B60R 2021/161; B60R 2021/23316; B60R 21/237
See application file for complete search history.

(56) References Cited

U.S. PATENT DOCUMENTS

| | | | | |
|---|---|---|---|---|
| 6,176,515 B1* | 1/2001 | Wallner | ................ | B60R 21/232 280/729 |
| 6,672,612 B2* | 1/2004 | Sauer | .................... | B60R 21/232 280/730.2 |
| 6,793,240 B2* | 9/2004 | Daines | .................. | B60R 21/232 280/729 |
| 6,796,577 B2* | 9/2004 | Challa | .................. | B60R 21/232 280/730.2 |
| 7,048,301 B2* | 5/2006 | Walsh | ............... | B60R 21/23184 280/730.2 |
| 7,077,426 B2* | 7/2006 | Shaker | .................. | B60R 21/232 280/730.2 |
| 7,172,212 B2* | 2/2007 | Aoki | ..................... | B60R 21/213 280/730.2 |

(Continued)

FOREIGN PATENT DOCUMENTS

| JP | 2002-293211 A | 10/2002 |
|---|---|---|
| JP | 2002-337648 A | 11/2002 |

(Continued)

*Primary Examiner* — Laura Freedman
(74) *Attorney, Agent, or Firm* — Oliff PLC

(57) ABSTRACT

When a curtain airbag inflates and expands, an independent portion inside a slit portion inflates and expands toward a vehicle lower side toward a gap between a seat back and a center pillar garnish. If the independent portion interferes with the seat back, the independent portion inflects in the vehicle width direction. Meanwhile, regions of the curtain airbag other than the independent portion inflate and expand toward the vehicle lower side without being affected by the position of the independent portion.

9 Claims, 10 Drawing Sheets

(56) References Cited

U.S. PATENT DOCUMENTS

| | | | | |
|---|---|---|---|---|
| 7,708,308 | B2* | 5/2010 | Abney, III | B60R 21/233 |
| | | | | 280/730.2 |
| 7,909,357 | B2* | 3/2011 | Iida | B60R 21/232 |
| | | | | 280/730.1 |
| 8,613,466 | B2* | 12/2013 | Wiik | B60R 21/213 |
| | | | | 280/730.2 |
| 2002/0096863 | A1 | 7/2002 | Tanase et al. | |
| 2007/0013173 | A1 | 1/2007 | Kino et al. | |
| 2020/0108792 | A1* | 4/2020 | Ohno | B60R 21/235 |

FOREIGN PATENT DOCUMENTS

| | | |
|---|---|---|
| JP | 2007-022265 A | 2/2007 |
| JP | 2012086829 A * | 5/2012 |

* cited by examiner

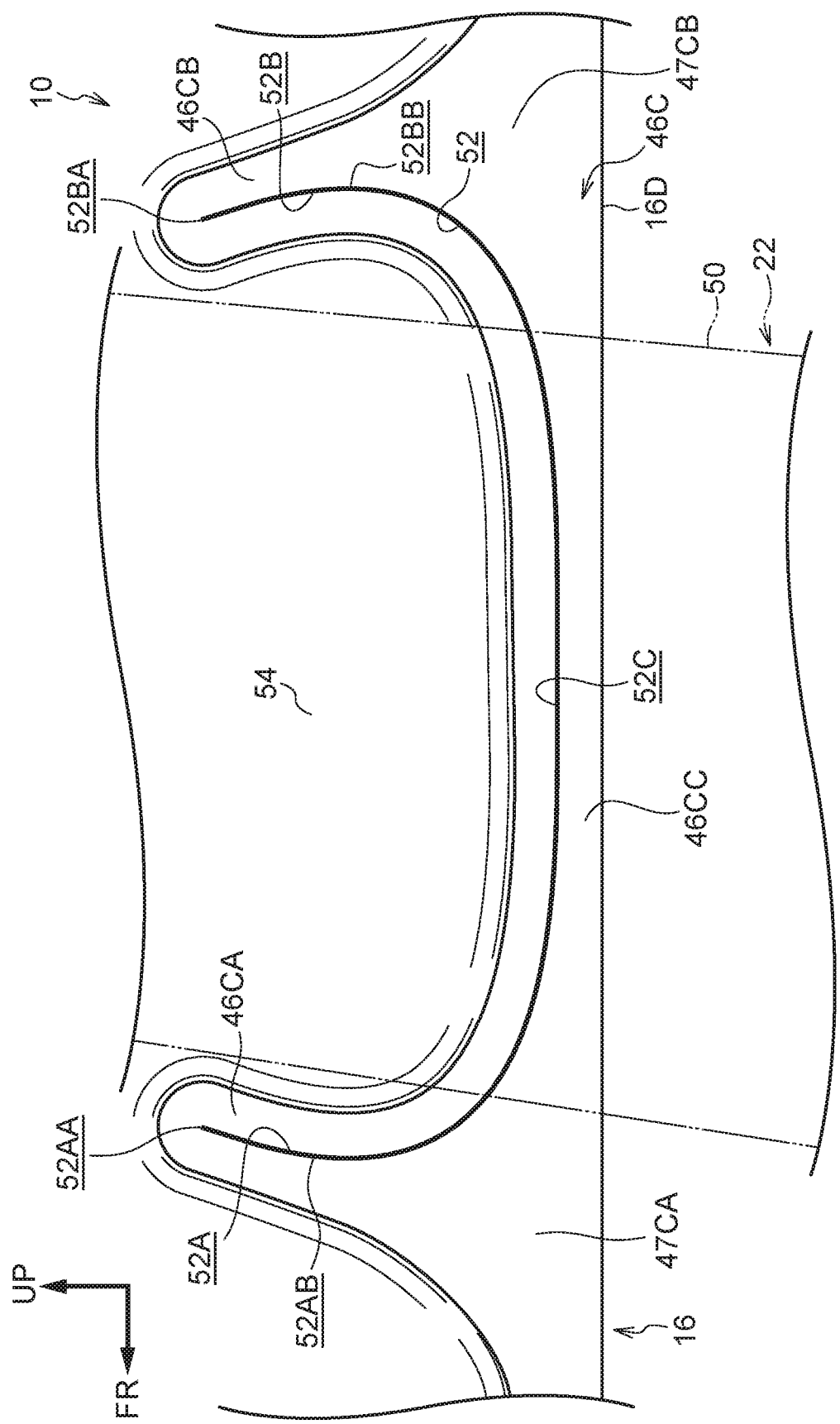

CURTAIN AIRBAG DEVICE FOR VEHICLE

CROSS-REFERENCE TO RELATED APPLICATION

This application is based on and claims priority under 35 USC 119 from Japanese Patent Application No. 2018-188244 filed on Oct. 3, 2018, the disclosure of which is incorporated by reference herein.

BACKGROUND

Technical Field

The present disclosure relates to a curtain airbag device for a vehicle.

Related Art

Japanese Patent Application Laid-Open (JP-A) No. 2002-293211 (Patent Document 1) discloses an invention relating to a head protection airbag device. This head protection airbag device includes a curtain airbag that inflates and deploys at a vehicle width direction outer side of a vehicle occupant. A region of a lower edge portion of the curtain airbag that is disposed to the side of a seat back of a vehicle seat is disposed at the vehicle upper side relative to other regions of the lower edge portion. As a result, interference between the lower edge portion of the curtain airbag and an upper portion of the seat back during inflation and deployment is suppressed.

JP-A No. 2002-337648 (Patent Document 2) discloses a further invention relating to a head protection airbag device. This head protection airbag device includes a curtain airbag that inflates and deploys at a vehicle width direction outer side of a vehicle occupant. A region of a lower edge portion of the curtain airbag that corresponds with a center pillar garnish is notched so as to be cut away toward the vehicle upper side. As a result, cases of the curtain airbag catching on an upper end portion of the center pillar garnish during inflation and deployment are suppressed.

SUMMARY

During autonomous driving of a self-driving vehicle that conducts driving autonomously, because a driver is released from driving, the driver is likely to adopt any of various postures. In order to restrain a vehicle occupant in various postures at these times, providing a shoulder belt anchor, through which a shoulder belt that restrains the vehicle occupant passes, at a shoulder aperture of a seat back of a vehicle seat has been considered. In this structure, if the vehicle occupant greatly reclines the seat back of the vehicle seat to adopt a comfortable posture or slides the vehicle seat far to the vehicle rear side, the seat back of the vehicle seat is likely to overlap with a center pillar garnish in a vehicle side view. (Below, a state in which the seat back coincides with the center pillar garnish in the vehicle side view is referred to as "the comfortable state".) In the comfortable state, a space at the vehicle width direction outer side of the seat back is narrowed by the center pillar garnish protruding into the passenger compartment.

If a curtain airbag inflates and deploys in the comfortable state, a lower edge portion of the curtain airbag may interfere with the shoulder belt anchor at the vehicle seat and be pushed up toward the vehicle upper side. Thus, the position of the curtain airbag relative to the vehicle occupant may vary from a pre-specified position, which may affect vehicle occupant restraint performance. Accordingly, disposing a region of the lower edge portion of a curtain airbag further to the vehicle upper side as in the structure disclosed in Patent Document 1 or notching a portion of the lower edge portion of the curtain airbag as in the structure disclosed in Patent Document 2 can be considered. However, with these structures, a coverage area of an inflating portion of the curtain airbag that restrains a vehicle occupant is reduced. Therefore, vehicle occupant restraint performance in situations other than the comfortable state may deteriorate. There is scope for improvement of the related art in this respect.

In consideration of the circumstances described above, an object of the present invention is to provide a curtain airbag device for a vehicle that may provide vehicle occupant restraint performance both in a state in which a center pillar garnish overlaps with a seat back in a vehicle side view and in other states.

Solution to Problem

A curtain airbag device for a vehicle according to a first aspect of the present invention includes: a curtain airbag including an inflating portion that, in a case in which an inflator activates at a time of vehicle collision and supplies gas into the inflating portion, is inflated and deployed toward a vehicle lower side from an end portion of a vehicle width direction outer side of a ceiling, and a center pillar non-inflating portion that is provided at a vehicle lower side of a region of the inflating portion that overlaps, in a vehicle side view, with a center pillar garnish in a case in which the inflating portion is inflated and deployed, the center pillar non-inflating portion spanning across the center pillar garnish and not being inflated and deployed in a case in which gas is supplied from the inflator; and a slit portion provided at the center pillar non-inflating portion, the slit portion including a front slit that extends substantially in a vehicle vertical direction at a vehicle front side of the center pillar garnish, a rear slit that extends substantially in the vehicle vertical direction at a vehicle rear side of the center pillar garnish, and a bottom slit that extends substantially in a vehicle front-rear direction, between respective lower end portions of the front slit and the rear slit, the slit portion being formed substantially in a "U" shape that opens toward a vehicle upper side in a vehicle side view.

The curtain airbag device for a vehicle according to the first aspect includes the curtain airbag and the slit portion. The curtain airbag includes the inflating portion and the center pillar non-inflating portion. At a time of vehicle collision, the interior of the inflating portion is supplied with gas from the inflator, as a result of which the inflating portion inflates and expands toward the vehicle lower side from the vehicle width direction outer side end portion of the ceiling. The center pillar non-inflating portion is provided at the vehicle lower side of the region of the inflating portion that overlaps with the center pillar garnish in the vehicle side view. The center pillar non-inflating portion spans across the center pillar garnish and does not inflate and expand when the gas is supplied from the inflator. The slit portion is provided at the center pillar non-inflating portion. The front slit, the rear slit and the bottom slit are formed in the slit portion so as to form the substantial "U" shape that opens toward the vehicle upper side in the vehicle side view. As a result, during the inflation and deployment, a region of the curtain airbag inside the slit portion (below referred to as "the independent portion") is displaced so as to inflect in the vehicle width direction relative to regions of the curtain airbag other than the independent portion, with an axis of the inflection being an imaginary line that links an upper end portion of the front slit with an upper end portion of the rear slit.

If the curtain airbag inflates and expands when the vehicle seat is in the comfortable state, the independent portion inflates and expands toward the vehicle lower side toward a gap between the seat back of the vehicle seat and the center pillar garnish. However, because a space at the vehicle width direction outer side of the seat back is narrowed by the center pillar garnish, the independent portion interferes with the seat back and is put into the state that is inflected in the vehicle width direction. Meanwhile, because of the slit portion, regions of the curtain airbag other than the independent portion may move relative to the independent portion. Therefore, the regions of the curtain airbag other than the independent portion may inflate and expand toward the vehicle lower side regardless of the state of the independent portion. Thus, cases of the whole of the lower edge portion of the curtain airbag being pushed up toward the vehicle upper side by the seat back in the comfortable state may be suppressed, and variations of the position of the curtain airbag relative to vehicle occupants at times of inflation and deployment may be suppressed. Therefore, variations in position of the curtain airbag in the comfortable state and in other states may be suppressed without a reduction in the coverage area of the inflating portion.

The slit portion is provided at the center pillar non-inflating portion that spans across the center pillar garnish. That is, even when the independent portion is displaced to the vehicle width direction outer side of the curtain airbag during inflation and deployment, regions of the center pillar non-inflating portion other than the independent portion are not displaced. Therefore, the lower end portion of the curtain airbag is not divided in the vehicle front-and-rear direction. Consequently, tension in the curtain airbag in the vehicle front-and-rear direction is maintained, which may contribute to maintaining deployment consistency, restraint performance and the like of the curtain airbag.

The meaning of the term "center pillar garnish" as used herein is intended to encompass an interior finish member that covers a pillar (a center pillar) located between a front seat and rear seat of a vehicle from the passenger compartment interior side of the pillar, an interior finish member that covers a pillar located at the vehicle rear side of a door in a two-door vehicle from the passenger compartment interior side of the pillar, an interior finish member that covers a reinforcing member (an in-door pillar) installed in a door of a "center-pillarless" vehicle that does not have a center pillar, and an interior finish member provided at a location corresponding with the seat back of a front vehicle seat in a passenger compartment.

The meaning of the term "slit portion" as used herein is intended to refer to a slit portion structured by a gap/gaps provided in the curtain airbag, encompassing a gap that is formed by an incision being cut in a base fabric of the curtain airbag by a laser, a blade or the like, and a gap that is formed between the base fabric of a curtain airbag and another member by the another member being superposed with the base fabric of the curtain airbag and joined to the base fabric at end portions thereof opposing the another member.

In a curtain airbag device for a vehicle according to a second aspect of the present invention, in the curtain airbag device for a vehicle according to the first aspect: the center pillar non-inflating portion includes a front side non-inflating portion that extends substantially in the vehicle vertical direction, the front side non-inflating portion protruding toward the inflating portion from a lower end of the curtain airbag at the vehicle front side of the center pillar garnish, a rear side non-inflating portion that extends substantially in the vehicle vertical direction, the rear side non-inflating portion protruding toward the inflating portion from the lower end of the curtain airbag at the vehicle rear side of the center pillar garnish, and a bottom non-inflating portion that extends substantially in the vehicle front-rear direction between respective lower end portions of the front side non-inflating portion and the rear side non-inflating portion; the front slit is formed at the front side non-inflating portion, the rear slit is formed at the rear side non-inflating portion, and the bottom slit is formed at the bottom non-inflating portion; and the curtain airbag includes an independent portion that includes the inflating portion that is surrounded by the front slit, the rear slit and the bottom slit.

In the curtain airbag device for a vehicle according to the second aspect, the front side non-inflating portion and the rear side non-inflating portion project toward the inflating portion from the lower end of the curtain airbag at the vehicle front side and rear side of the center pillar garnish and extend substantially in the vehicle vertical direction. The front slit is formed in the front side non-inflating portion and the rear slit is formed in the rear side non-inflating portion. The independent portion surrounded by the front slit, rear slit and bottom slit may be formed to include the inflating portion. Therefore, the coverage area of the inflating portion may be kept large and variations in position of the curtain airbag in the comfortable state and in other states may be suppressed.

In a curtain airbag device for a vehicle according to a third aspect of the present invention, in the curtain airbag device for a vehicle according to the first or second aspects, during inflation and deployment of the curtain airbag, respective upper end portions of the front slit and the rear slit of the slit portion are disposed at the vehicle upper side in the vehicle side view relative to a shoulder aperture at a vehicle width direction outer side of a seat back of a vehicle seat.

According to the curtain airbag device for a vehicle according to the third aspect, during inflation and deployment of the curtain airbag, the respective upper end portions of the front slit and rear slit of the slit portion of the curtain airbag are disposed, in the vehicle side view, at the vehicle upper side relative to the shoulder aperture at the vehicle width direction outer side of the seat back of the vehicle seat. That is, the imaginary line that links the upper end portion of the front slit with the upper end portion of the rear slit is disposed at the vehicle upper side relative to the shoulder aperture of the seat back that interferes with the lower edge portion of the curtain airbag during inflation and deployment. Therefore, if the independent portion abuts against the shoulder aperture when the curtain airbag inflates and expands in the comfortable state, the independent portion displaces so as to inflect in the vehicle width direction about the imaginary line disposed at the vehicle upper side of the shoulder aperture. Therefore, because amounts of interference between the shoulder aperture and the independent portion in the comfortable state may be reduced, cases of the whole of the lower edge portion of the curtain airbag being pushed up toward the vehicle upper side by interference between the shoulder aperture and the independent portion and variations of the position of the curtain airbag relative to vehicle occupants may be further suppressed.

In a curtain airbag device for a vehicle according to a fourth aspect of the present invention, in the curtain airbag device for a vehicle according to the first or second aspects, during inflation and deployment of the curtain airbag, respective upper end portions of the front slit and the rear slit of the slit portion are disposed at the vehicle upper side in the vehicle side view relative to a shoulder belt anchor that is provided and exposed at a shoulder aperture at a vehicle width direction outer side of a seat back of a vehicle seat.

According to the curtain airbag device for a vehicle according to the fourth aspect, during inflation and deployment of the curtain airbag, the respective upper end portions of the front slit and rear slit of the slit portion of the curtain airbag are disposed, in the vehicle side view, at the vehicle upper side relative to the shoulder belt anchor that is provided and exposed at the shoulder aperture at the vehicle width direction outer side of the seat back of the vehicle seat. That is, the imaginary line that links the upper end portion of the front slit with the upper end portion of the rear slit is disposed at the vehicle upper side relative to the shoulder belt anchor that interferes with the lower edge portion of the curtain airbag during inflation and deployment. Therefore, if the independent portion abuts against the shoulder belt anchor when the curtain airbag inflates and expands in the comfortable state, the independent portion displaces so as to inflect in the vehicle width direction about the imaginary line disposed at the vehicle upper side of the shoulder belt anchor. Therefore, because amounts of interference between the shoulder belt anchor and the independent portion in the comfortable state may be reduced, cases of the whole of the lower edge portion of the curtain airbag being pushed up toward the vehicle upper side by interference between the shoulder belt anchor and the independent portion and variations of the position of the curtain airbag relative to vehicle occupants may be further suppressed.

In a curtain airbag device for a vehicle according to a fifth aspect of the present invention, in the curtain airbag device for a vehicle according to any one of the first to fourth aspects, the slit portion is discontinuous in a direction of extension of the slit portion.

According to the curtain airbag device for a vehicle according to the fifth aspect, because the slit portion is formed by the slit that is discontinuous in the direction of extension of the slit portion, the independent portion is in a connected state with other regions of the curtain airbag at usual times. Therefore, movement of the independent portion during a folding operation when the curtain airbag is being packed may be suppressed, which improves ease of operation of the folding operation. However, when expansion pressure is applied by the gas being supplied to the interior of the curtain airbag, portions between the slits of the slit portion break, and the slit portion becomes a continuous long slit. Hence, the independent portion may be relatively displaced with respect to the other regions.

In a curtain airbag device for a vehicle according to a sixth aspect of the present invention, the curtain airbag device for a vehicle according to any one of the first to fifth aspects further includes a connecting member that is a separate body at a vehicle lower side of the center pillar non-inflating portion, the connecting member connecting respective lower end portions of the center pillar non-inflating portion at the vehicle front side of the front slit and the vehicle rear side of the rear slit with one another substantially in the vehicle front-and-rear direction.

According to the curtain airbag device for a vehicle according to the sixth aspect, the connecting member that is a separate body is provided at the vehicle lower side of the center pillar non-inflating portion. This connecting member connects the respective lower end portions of the center pillar non-inflating portion at the vehicle front side of the front slit and at the vehicle rear side of the rear slit with one another. Accordingly, both tension in the curtain airbag in the vehicle front-and-rear direction is maintained at a time of inflation and deployment and relative displacement of the independent portion is enabled. Because the connecting member is formed as a separate body, it is easy to maintain the connected state even if tension in the curtain airbag in the vehicle front-and-rear direction is large at a time of inflation and deployment, by increasing a thickness of the connecting member, increasing a join strength between the center pillar non-inflating portion and the connecting member, or the like.

Advantageous Effects of Invention

The curtain airbag device for a vehicle according to the first aspect provides an excellent effect in that vehicle occupant restraint performance may be provided both in a state in which a center pillar garnish overlaps with a seat back in a vehicle side view and in other states.

The curtain airbag device for a vehicle according to the second, third or fourth aspect provides an excellent effect in that further vehicle occupant restraint performance may be provided both in the state in which the center pillar garnish overlaps with the seat back in the vehicle side view and in other states.

The curtain airbag device for a vehicle according to the fifth aspect provides an excellent effect in that both vehicle occupant restraint performance may be improved and ease of operation when folding the curtain airbag may be improved.

The curtain airbag device for a vehicle according to the sixth aspect provides an excellent effect that may contribute to assuring deployment consistency, restraint performance and the like of the curtain airbag.

BRIEF DESCRIPTION OF THE DRAWINGS

Preferred embodiments will be described in detail based on the following figures, wherein:

FIG. 10 is a magnified side view, corresponding with FIG. 2, showing a slit portion of a curtain airbag device for a vehicle according to an alternative embodiment.

DETAILED DESCRIPTION

First Exemplary Embodiment

Herebelow, a first exemplary embodiment of the curtain airbag device for a vehicle relating to the present invention is described using FIG. 1 to FIG. 6. An arrow FR that is shown as appropriate in these drawings indicates a vehicle front side, an arrow UP indicates a vehicle upper side, and an arrow OUT indicates a vehicle width direction outer side.

—Overall Structure—

Figure 1:
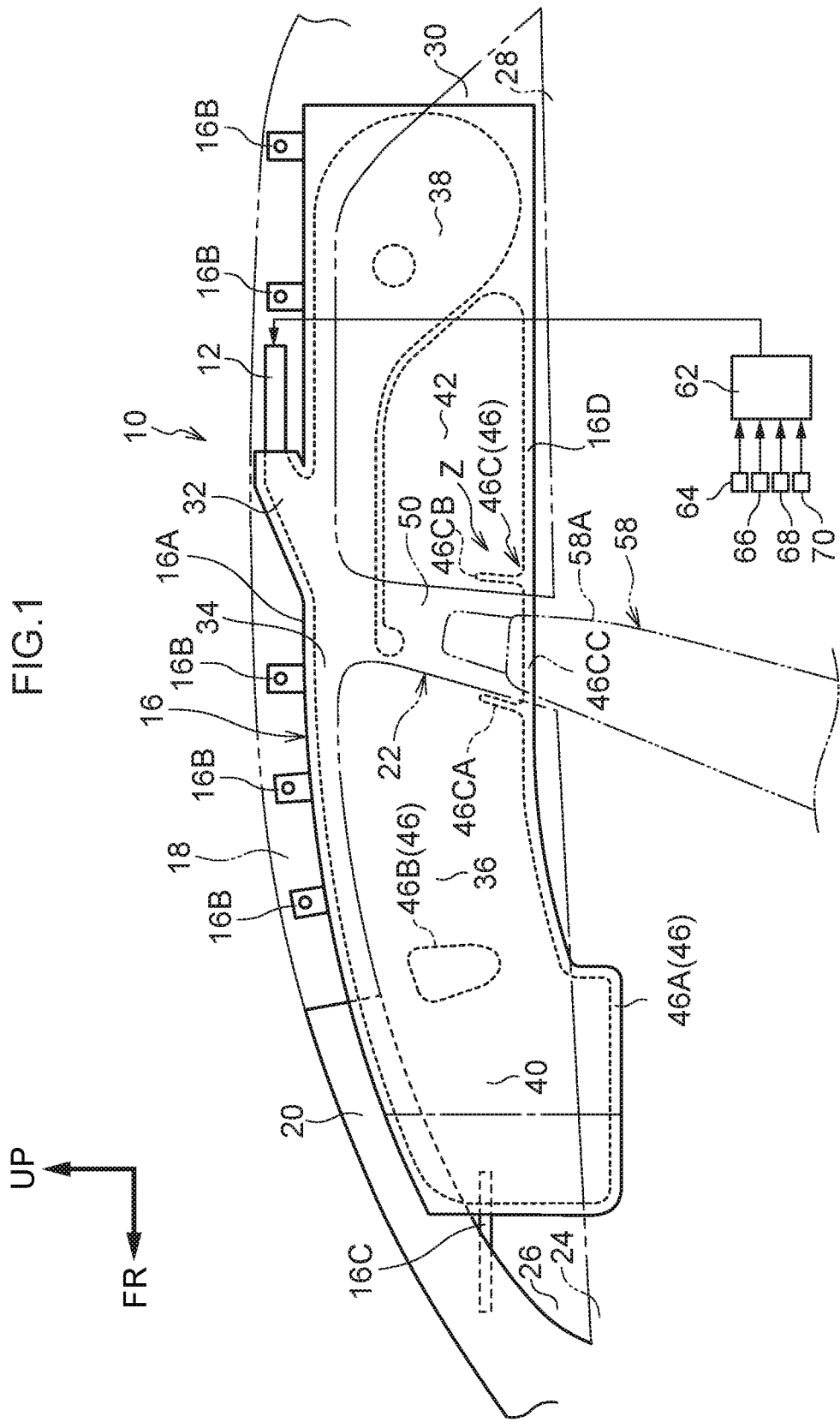
FIG. 1 is a side view showing an inflated and expanded state of a curtain airbag device for a vehicle according to a first exemplary embodiment.

FIG. 1 shows a side view, seen from a passenger compartment inner side, of an activated state of a curtain airbag device for a vehicle 10 according to the present exemplary embodiment. As shown in FIG. 1, the curtain airbag device for a vehicle 10 includes an inflator 12 with a substantially cylindrical shape and a curtain airbag 16. The inflator 12 generates gas at a time of vehicle collision. The curtain airbag 16 is connected with the inflator 12, receives a supply of the gas generated by the inflator 12, and inflates and expands.

In a state before installation of the curtain airbag device for a vehicle 10 in the vehicle, the curtain airbag device for a vehicle 10 is assembled to be a member with a long, narrow, elongated shape by outward roll-folding of the curtain airbag 16. The term "outward roll-folding" refers to a folding mode in which a roll-folded portion, which is not shown in the drawings, is disposed at the vehicle width direction outer side during the process of deployment of the curtain airbag 16 (i.e., the opposite side of the curtain airbag 16 from the side thereof at which the head area of a vehicle occupant will be disposed). The curtain airbag device for a vehicle 10 in this state is stowed into a space between a roof side rail 18 and an end portion 19A at the vehicle width direction outer side of a roof lining 19 that serves as a ceiling (see FIG. 4), a space between a front pillar that is not shown in the drawings and a front pillar garnish 20 disposed at the passenger compartment inner side of the front pillar, and a space between a rear pillar and a rear pillar garnish disposed at the passenger compartment inner side of the rear pillar (neither of which is shown in the drawings).

The inflator 12 is formed in a long, narrow, cylindrical shape and is disposed, for example, at the vehicle upper side of a vicinity of a center pillar 22 with an axial direction of the inflator 12 in the vehicle front-and-rear direction. Plural gas jetting holes, which are not shown in the drawings, are formed in a distal end outer periphery portion of the inflator 12. The interior of the inflator 12 is charged with, for example, a gas generating agent. When the inflator 12 is activated, the gas generating agent ignites and generates a large volume of gas, and the gas is jetted out through the gas jetting holes. The inflator 12 with this structure is fixed to the roof side rail 18 via a bracket, which is not shown in the drawings. A center pillar garnish 50 is provided at the passenger compartment inner side of the center pillar 22. The center pillar garnish 50 serves as an interior finish member that covers the passenger compartment inner side of the center pillar 22.

—Curtain Airbag—

The curtain airbag 16 is constituted as a fabric member in a substantially rectangular bag shape that is specified to be large enough, when the curtain airbag 16 inflates and expands, to substantially cover both a side window 26 of a side door 24 at a front seat and a side window 30 of a side door 28 at a rear seat in a vehicle side view. To describe this more specifically, the curtain airbag 16 is provided with a gas introduction portion 32, a gas supply portion 34, a front main chamber 36, a rear main chamber 38, a front delay chamber 40 and a rear delay chamber 42. A distal end side of the inflator 12 is inserted into the gas introduction portion 32. The gas supply portion 34 extends in a linear shape in the vehicle front-and-rear direction along an upper edge of the curtain airbag 16. The front main chamber 36 corresponds to a protection area for the head area of a vehicle occupant sitting on a front vehicle seat 58 and serves as an inflation portion that inflates and expands at the vehicle width direction outer side of this head area. The rear main chamber 38 corresponds to a protection area for the head area of a vehicle occupant sitting on a rear vehicle seat that is not shown in the drawings and serves as the inflation portion that inflates and expands at the vehicle width direction outer side of this head area. The front delay chamber 40 is provided adjacent to the front side of the front main chamber 36 in the vehicle front-and-rear direction and serves as the inflation portion. The rear delay chamber 42 is provided adjacent to the front side of the rear main chamber 38 in the vehicle front-and-rear direction and serves as the inflation portion.

A lower edge portion 16D of the curtain airbag 16 is specified so as to be disposed, in the vehicle side view, at the vehicle lower side relative to the head area of the vehicle occupant sitting on the vehicle seat 58 in the comfortable state. In the present exemplary embodiment, as an example, a crash test dummy (mannequin) that serves as a model of a vehicle occupant to be protected is seated on the vehicle seat 58 in a reclining state (a state in which a seat back 58A is tilted), and the lower edge portion 16D of the curtain airbag 16 is disposed at the vehicle lower side relative to the head area of the dummy. The dummy is, for example, a WorldSID (World Side Impact Dummy) AF05 dummy (representing the 5th percentile of American adult females).

As a supplementary description of portions through which the gas is supplied from the curtain airbag 16, the gas introduction portion 32 is formed at a substantially central portion in the vehicle front-and-rear direction of an upper edge portion 16A of the curtain airbag 16. The inflator 12 is connected to the gas introduction portion 32. Thus, the generated gas from the inflator 12 passes through the gas introduction portion 32 and is supplied into the curtain airbag 16. The gas introduction portion 32 is in fluid communication with a central portion in the vehicle front-and-rear direction of the gas supply portion 34.

The front main chamber 36 inflates and expands over a coverage area wrapping across the center pillar 22 from a vicinity of a central portion in the vehicle front-and-rear direction of the side window 26 at the front seat side. The front delay chamber 40 is disposed at the front side in the vehicle front-and-rear direction of the front main chamber 36, with a second non-inflating portion 46B, which is described below, therebetween. The front delay chamber 40 is formed so as to inflate in a cylindrical shape with a length direction in the vehicle vertical direction. According to the structure described above, the curtain airbag 16 expands toward the vehicle lower side from a vehicle width direction outer side end portion of the ceiling during the inflation and deployment.

Plural tabs 16B are integrally formed at a suitable spacing at the upper edge portion 16A of the curtain airbag 16. The plural tabs 16B project to the vehicle upper side from the upper edge portion 16A of the curtain airbag 16. The tabs 16B are fixed (anchored) at the roof side rail 18 by fasteners that are not shown in the drawings. One end portion of a tension belt 16C in a strap shape is attached to a front end portion of the curtain airbag 16. The other end portion of the tension belt 16C is fixed to the front pillar by a fixing bolt, which is not shown in the drawings.

The curtain airbag 16 and inflator 12 described above are respectively provided at both width direction sides of the vehicle. That is, the curtain airbag device for a vehicle 10 is equipped with a left and right pair of the curtain airbag 16 and a left and right pair of the inflator 12. The curtain airbag 16 and inflator 12 at the vehicle left side have structures with mirror symmetry with the curtain airbag 16 and inflator 12 at the vehicle right side. Therefore, descriptions thereof are not given here.

—Center Pillar Non-Inflating Portion—

Portions of the curtain airbag 16 other than those described above are non-inflating portions 46 into which the gas does not flow. Inflows of gas into each non-inflating portion 46 are restricted by, for example, a cloth member (base fabric) structuring the curtain airbag 16 at the vehicle width direction inner side being sewn together with a base fabric at the vehicle width direction outer side by an annular sewn portion that is not shown in the drawings. A plural number of the non-inflating portions 46 are formed. For example, a first non-inflating portion 46A is specified at outer periphery portions of the curtain airbag 16, and a second non-inflating portion 46B extends in the vehicle vertical direction between the front main chamber 36 and the front delay chamber 40. In addition, a variety of non-inflating portions 46 are specified at the curtain airbag 16 in order to reduce gas supply amounts and lower the output power of the inflator 12. The structures of the non-inflating portions 46 of the curtain airbag 16 are similar to, for example, widely known structures recited in JP-A No. 2016-055824 and the like. Therefore, these structures are not described in detail here.

Figure 2:
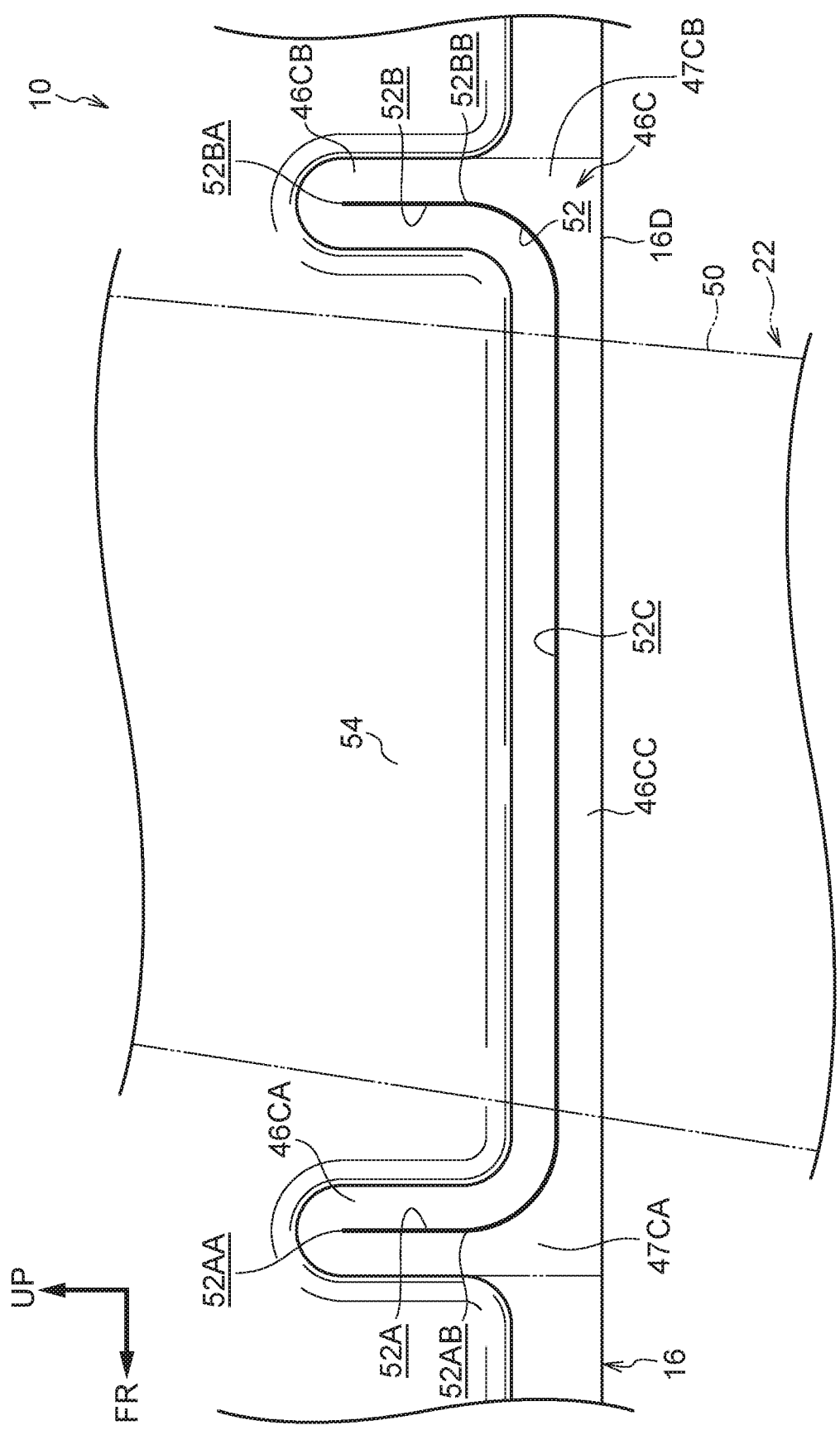
FIG. 2 is a magnified side view in which area Z in FIG. 1 is magnified.

A center pillar non-inflating portion 46C is provided at a portion of a region of the first non-inflating portion 46A that structures the lower edge portion 16D of the curtain airbag 16 at a time of inflation and deployment; that is, the center pillar non-inflating portion 46C is provided at a region of the first non-inflating portion 46A that overlaps with the center pillar garnish 50 in the vehicle side view and is at the vehicle lower side of the front main chamber 36. As shown in FIG. 2, the center pillar non-inflating portion 46C includes a front side non-inflating portion 46CA, a rear side non-inflating portion 46CB and a bottom non-inflating portion 46CC. In the vehicle side view, the front side non-inflating portion 46CA is disposed at the vehicle front side relative to the center pillar garnish 50 and extends in the vehicle vertical direction. In the vehicle side view, the rear side non-inflating portion 46CB is disposed at the vehicle rear side relative to the center pillar garnish 50 and extends in the vehicle vertical direction. In other words, the front side non-inflating portion 46CA and rear side non-inflating portion 46CB oppose one another in the vehicle front-and-rear direction, sandwiching the center pillar garnish 50. The bottom non-inflating portion 46CC extends so as to connect a lower end portion 47CA of the front side non-inflating portion 46CA with a lower end portion 47CB of the rear side non-inflating portion 46CB in the vehicle front-and-rear direction. The bottom non-inflating portion 46CC is, for example, a region that spans across the pair of two-dot chain lines in FIG. 2 (i.e., the center pillar garnish 50). Thus, in the vehicle side view, the center pillar non-inflating portion 46C is formed in a substantial "U" shape in which the bottom non-inflating portion 46CC spans across the center pillar garnish 50. The bottom non-inflating portion 46CC is provided as a portion of the first non-inflating portion 46A. That is, the front side non-inflating portion 46CA and rear side non-inflating portion 46CB extend substantially in the vehicle vertical direction from a portion of the first non-inflating portion 46A (the bottom non-inflating portion 46CC).

—Slit Portion—

A slit portion 52 is provided in the center pillar non-inflating portion 46C. The slit portion 52 includes a front slit 52A, a rear slit 52B and a bottom slit 52C. The front slit 52A is provided at a substantially central portion in the vehicle front-and-rear direction of the front side non-inflating portion 46CA of the center pillar non-inflating portion 46C. The front slit 52A is formed as a slit (incision) that extends substantially in the vehicle vertical direction at the vehicle front side relative to the center pillar garnish 50.

The rear slit 52B is provided at a substantially central portion in the vehicle front-and-rear direction of the rear side non-inflating portion 46CB of the center pillar non-inflating portion 46C. The rear slit 52B is formed as a slit (incision) that extends substantially in the vehicle vertical direction at the vehicle rear side relative to the center pillar garnish 50.

Figure 3:
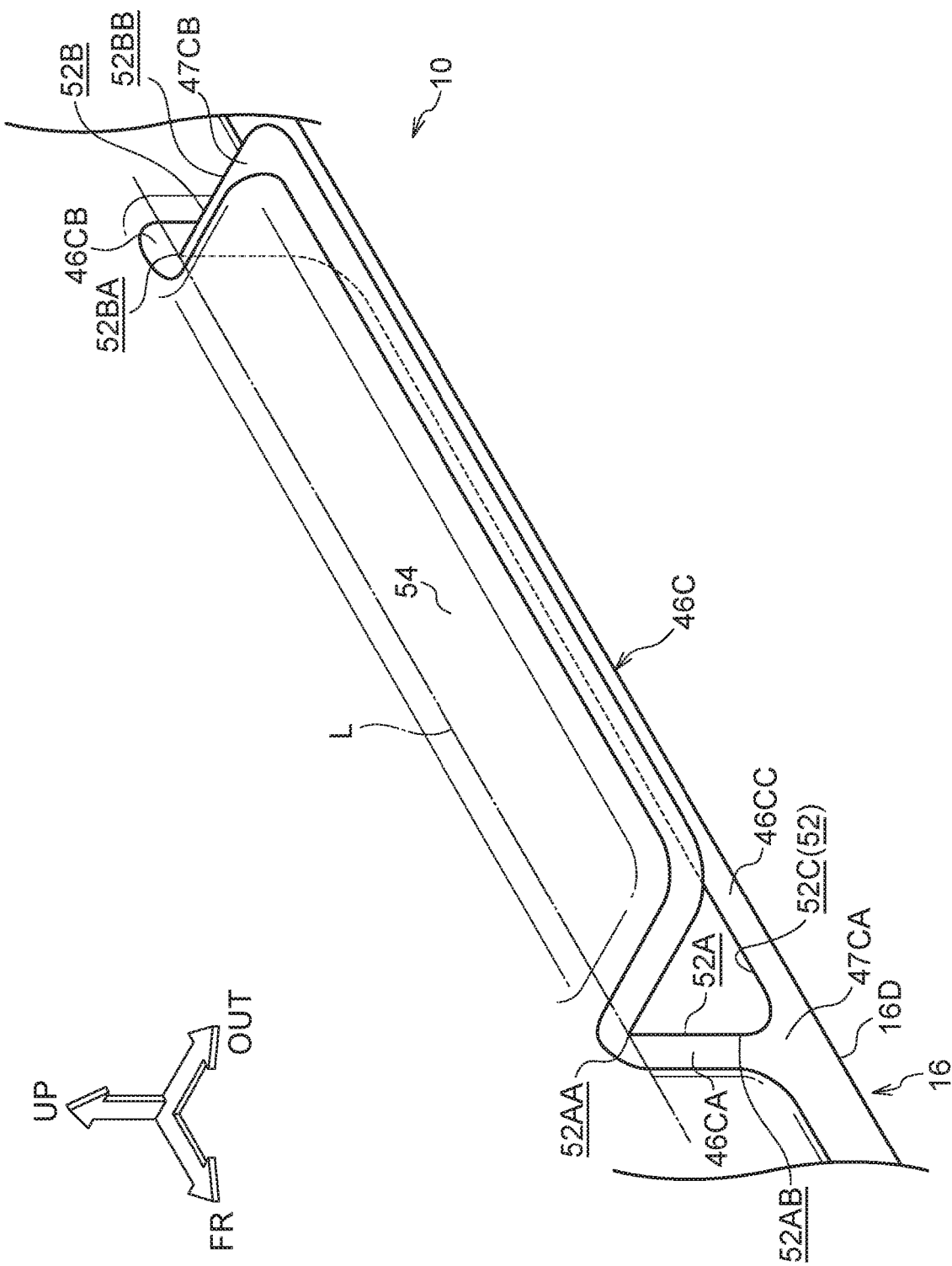
FIG. 3 is a schematic perspective view showing an example of a displaced state of an independent portion of the curtain airbag device for a vehicle according to the first exemplary embodiment.
Figure 4:
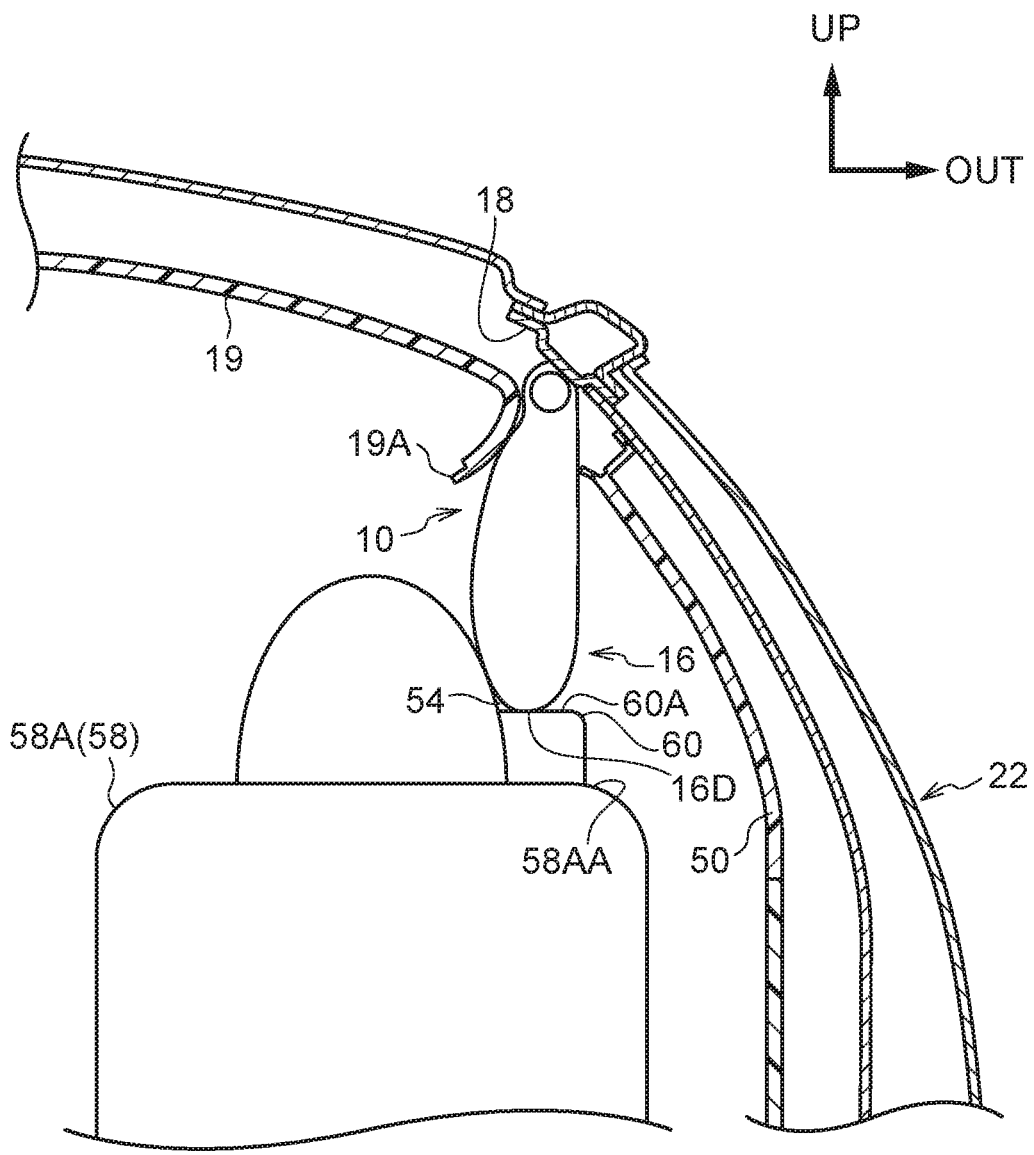
FIG. 4 is a front view showing a state in an initial stage of inflation and deployment of the curtain airbag device for a vehicle according to the first exemplary embodiment.

The bottom slit 52C is provided at a substantially central portion in the vehicle vertical direction of the bottom non-inflating portion 46CC of the center pillar non-inflating portion 46C. The bottom slit 52C is formed as a slit that connects a lower end portion 52AB of the front slit 52A with a lower end portion 52BB of the rear slit 52B substantially in the vehicle front-and-rear direction. The front slit 52A, rear slit 52B and bottom slit 52C of the slit portion 52 are continuous. Thus, in the vehicle side view, the slit portion 52 is formed in a substantial "U" shape with the bottom slit 52C spanning across the center pillar garnish 50. The center pillar non-inflating portion 46C is divided into an inner side and an outer side, sandwiching the slit portion 52 in the "U" shape. As shown in FIG. 3, a region of the curtain airbag 16 at the inner side of the slit portion 52 when the curtain airbag 16 inflates and expands serves as an independent portion 54. The independent portion 54 may be displaced in the vehicle width direction relative to other regions of the curtain airbag 16, about an axis that is an imaginary line L linking an upper end portion 52AA of the front slit 52A with an upper end portion 52BA of the rear slit 52B. As mentioned above, the bottom slit 52C of the slit portion 52 extends at a substantially central portion in the vehicle vertical direction of the bottom non-inflating portion 46CC in the vehicle side view (see FIG. 2). Therefore, even if the independent portion 54 of the curtain airbag 16 is displaced in the vehicle width direction during inflation and deployment, a portion of the bottom non-inflating portion 46CC (at the lower side relative to the bottom slit 52C) remains in a state of being integral with the first non-inflating portion 46A. As a result, tension in the curtain airbag 16 in the vehicle front-and-rear direction is maintained.

Figure 6:
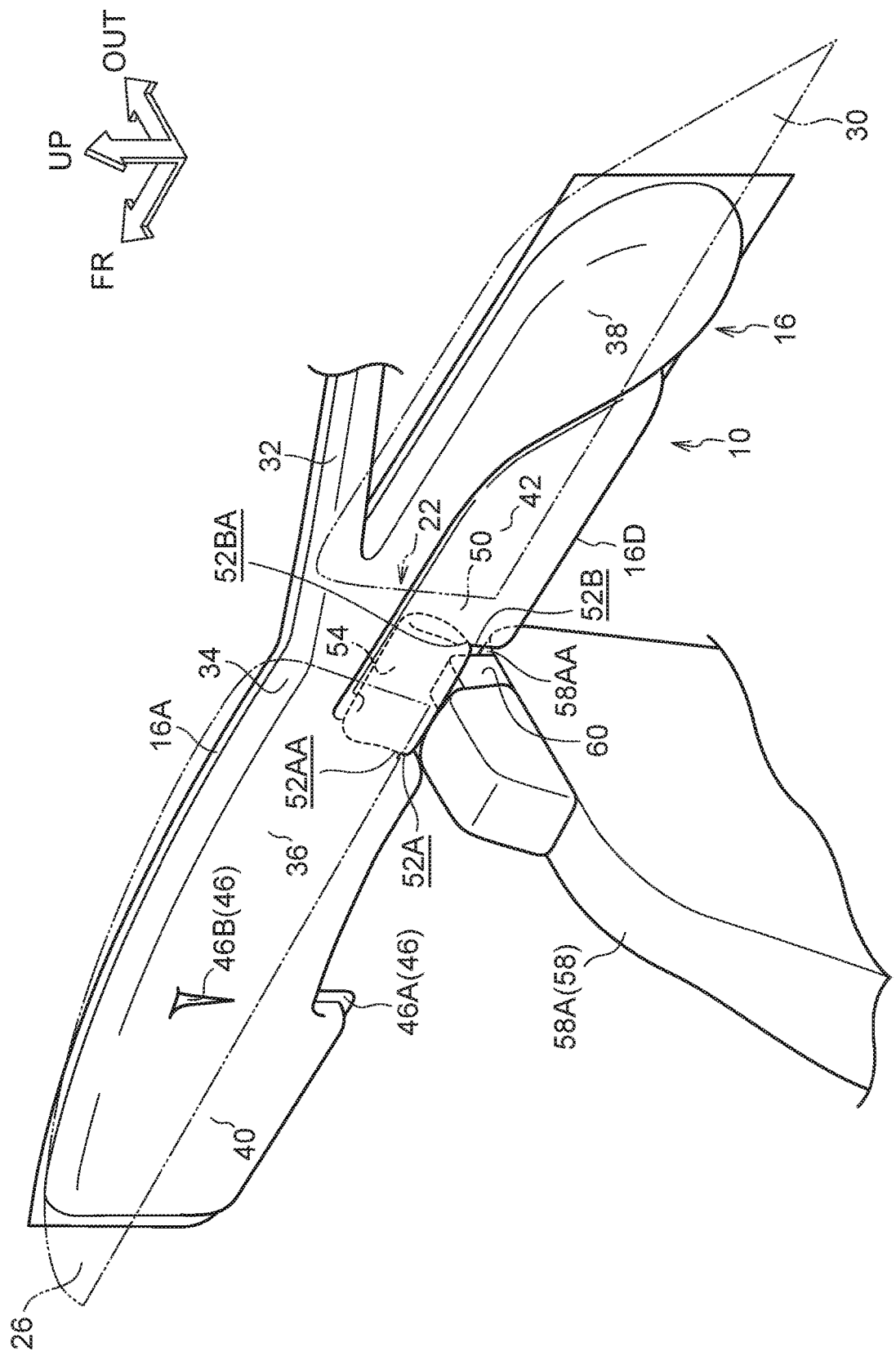
FIG. 6 is a schematic perspective view, seen from the vehicle rear side, showing an inflated and expanded state of the curtain airbag device for a vehicle according to the first exemplary embodiment.

The vehicle seat 58 is disposed at the vehicle width direction inner side of the curtain airbag 16. A shoulder belt anchor 60 is provided and exposed at a shoulder aperture 58AA at the vehicle width direction outer side of the seat back 58A of the vehicle seat 58. As shown in FIG. 6, the respective upper end portions 52AA and 52BA of the front slit 52A and rear slit 52B of the slit portion 52 are disposed at the vehicle upper side relative to the shoulder belt anchor 60 during inflation and deployment. A shoulder belt, which is not shown in the drawings, is inserted through the shoulder belt anchor 60. The shoulder belt anchor 60 is structured so as to project to the vehicle upper side from the shoulder aperture 58AA. The respective upper end portions 52AA and 52BA of the front slit 52A and rear slit 52B are disposed at the vehicle upper side relative to an upper face 60A of the shoulder belt anchor 60.

As illustrated in FIG. 1, activation of the curtain airbag device for a vehicle 10 described above is controlled by a controller 62. For example, a front airbag sensor 64, a small overlap collision prediction sensor 66, a side collision prediction sensor 68 and a rollover prediction sensor 70 are connected to the input side of the controller 62. The front airbag sensor 64 is provided at a front side member or the like, and principally predicts full overlap collisions and offset collisions, including oblique impacts. The small overlap collision prediction sensor 66 is disposed at, for example, a portion of a front bumper reinforcement that is at the vehicle width direction outer side relative to a portion thereof connecting with the front side member (a curved corner portion or the like), and principally predicts small overlap collisions. The side collision prediction sensor 68 is disposed at the center pillar or the like and principally predicts side collisions. The rollover prediction sensor 70 is disposed near a central portion of the vehicle body floor and predicts toppling of the vehicle. The output side of the controller 62 is connected to the inflator 12 of the curtain airbag device for a vehicle 10 and suchlike.

To expand on this, the term "oblique impact" (a moving deformable barrier collision or oblique collision) refers to, for example, a collision from diagonally forward of the vehicle (for example, a collision with a relative collision angle of 15° and an overlap amount in the vehicle width direction of around 35%) as defined by the NHTSA (National Highway Transport Safety Administration). In this exemplary embodiment, the relative speed of an oblique impact is assumed to be, as an example, 90 km/h. The meaning of the term "small overlap collision" includes a frontal collision of an automobile that is, for example, a collision defined by the Insurance Institute for Highway Safety (IIHS) in which an overlap amount of the collision in the vehicle width direction is no more than 25%. For example, an impact against the vehicle width direction outer side relative to the front side member, which is a vehicle body framework member, corresponds to the term "small overlap collision". In this exemplary embodiment, the relative speed of a small overlap collision is assumed to be, as an example, 64 km/h.

Operation and Effects of the First Exemplary Embodiment

Now, operation and effects of the first exemplary embodiment are described.

In the present exemplary embodiment, as shown in FIG. 1, the curtain airbag device for a vehicle 10 includes the curtain airbag 16 and the slit portion 52. The curtain airbag 16 includes the front main chamber 36, the rear main chamber 38, the front delay chamber 40, the rear delay chamber 42 and the center pillar non-inflating portion 46C. Of these, gas is supplied into the front main chamber 36, rear main chamber 38, front delay chamber 40 and rear delay chamber 42 from the inflator 12 at a time of vehicle collision. Thus, the front main chamber 36, rear main chamber 38, front delay chamber 40 and rear delay chamber 42 are inflated and expanded toward the vehicle lower side from the end portion 19A at the vehicle width direction outer side of the roof lining 19. The center pillar non-inflating portion 46C is provided at the vehicle lower side of a region of the front main chamber 36 that overlaps with the center pillar garnish 50 in the vehicle side view. The center pillar non-inflating portion 46C spans across the center pillar garnish 50 and does not inflate and expand when the gas is supplied from the inflator 12. The slit portion 52 is provided at the center pillar non-inflating portion 46C and is formed by the front slit 52A, rear slit 52B and bottom slit 52C as a slit that is formed substantially in a "U" shape that opens toward the vehicle upper side in the vehicle side view. Consequently, during the inflation and deployment, as shown in FIG. 3, the independent portion 54 of the curtain airbag 16 displaces so as to inflect toward the vehicle width direction outer side relative to regions of the curtain airbag 16 other than the independent portion 54, about the imaginary line L linking the upper end portion 52AA of the front slit 52A with the upper end portion 52BA of the rear slit 52B.

If the curtain airbag 16 inflates and expands when the vehicle seat 58 is in the comfortable state, the independent portion 54 inflates and expands toward the vehicle lower side between the seat back 58A of the vehicle seat 58 and the center pillar garnish 50. However, because the space at the vehicle width direction outer side of the seat back 58A is narrowed by the center pillar garnish 50, as shown in FIG. 6, the independent portion 54 interferes with the shoulder belt anchor 60 that is provided at the seat back 58A and that protrudes to the vehicle upper side relative to the shoulder aperture 58AA of the seat back 58A. Thus, the independent portion 54 inflects toward the vehicle width direction outer side and is bent back. Meanwhile, because of the slit portion 52, regions of the curtain airbag 16 other than the independent portion 54 may move relative to the independent portion 54. Therefore, the regions of the curtain airbag 16 other then the independent portion 54 may inflate and expand toward the vehicle lower side regardless of the state of the independent portion 54. Thus, cases of the whole of the lower edge portion 16D of the curtain airbag 16 being pushed up toward the vehicle upper side by the shoulder belt anchor 60 of the seat back 58A in the comfortable state may be suppressed, and variations of the position of the curtain airbag 16 relative to a vehicle occupant at times of inflation and deployment may be suppressed. Therefore, variations in position of the curtain airbag 16 in the comfortable state and in other states may be suppressed without a reduction in the coverage area of inflating portions such as the front main chamber 36 and the like. Consequently, vehicle occupant restraint performance may be provided in both the comfortable state in which the center pillar garnish 50 and the seat back 58A overlap in the vehicle side view and in other states.

Figure 5:
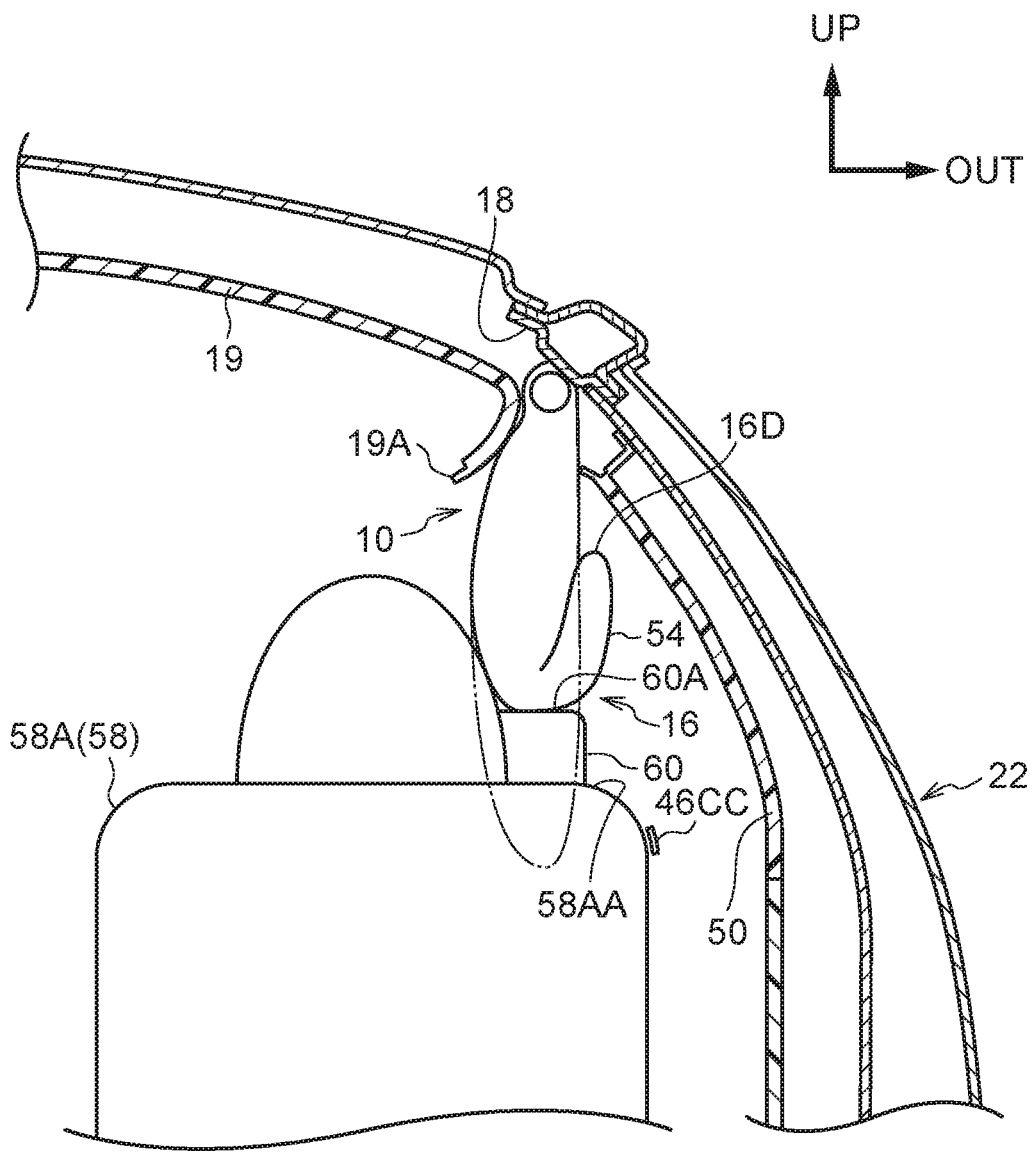
FIG. 5 is a front view showing a state in a later stage of inflation and deployment of the curtain airbag device for a vehicle according to the first exemplary embodiment.

In the vehicle side view, the bottom slit 52C of the slit portion 52 extends along the substantially central portion in the vehicle vertical direction of the bottom non-inflating portion 46CC (see FIG. 2). Therefore, as shown in FIG. 5, even when the independent portion 54 of the curtain airbag 16 is displaced to the vehicle width direction outer side during inflation and deployment, a portion of the bottom non-inflating portion 46CC remains in the state of being integral with the first non-inflating portion 46A. That is, the vehicle lower side of the first non-inflating portion 46A is not divided in the vehicle front-and-rear direction. Therefore, tension in the curtain airbag 16 in the vehicle front-and-rear direction is maintained. This may contribute to maintaining deployment consistency, restraint performance and the like of the curtain airbag 16. Because the bottom non-inflating portion 46CC is part of the non-inflating portion 46 that does not inflate and expand, the bottom non-inflating portion 46CC is smaller in thickness than inflating portions such as the front main chamber 36 and the like. Therefore, the bottom non-inflating portion 46CC may move into the space at the vehicle width direction outer side of the seat back 58A that is narrowed by the center pillar garnish 50 during the comfortable state. Therefore, cases of the lower edge portion 16D at regions of the curtain airbag 16 other than the independent portion 54 being pushed up toward the vehicle upper side by the shoulder belt anchor 60 or the seat back 58A may be suppressed.

During inflation and deployment of the curtain airbag 16, the respective upper end portions 52AA and 52BA of the front slit 52A and rear slit 52B of the slit portion 52 of the curtain airbag 16 are disposed, in the vehicle side view, at the vehicle upper side relative to the shoulder belt anchor 60 that is provided and exposed at the seat back 58A of the vehicle seat 58. That is, the imaginary line L that links the upper end portion 52AA of the front slit 52A with the upper end portion 52BA of the rear slit 52B (see FIG. 3) is disposed at the vehicle upper side relative to the shoulder belt anchor 60 of the seat back 58A that interferes with the lower edge portion 16D of the curtain airbag 16 during the inflation and deployment. Therefore, if the independent portion 54 abuts against the shoulder belt anchor 60 when the curtain airbag 16 is inflating and expanding in the comfortable state, the independent portion 54 displaces so as to inflect to the vehicle width direction outer side about the imaginary line L that is disposed at the vehicle upper side of the shoulder belt anchor 60. As a result, because amounts of interference between the shoulder belt anchor 60 and the independent portion 54 in the comfortable state may be reduced, cases of the whole of the lower edge portion 16D of the curtain airbag 16 being pushed up toward the vehicle upper side by interference between the shoulder belt anchor 60 and the independent portion 54 may be suppressed. Consequently, further vehicle occupant restraint performance may be provided both in the comfortable state and in other states.

As shown in FIG. 2, the independent portion 54 is formed in a substantially rectangular shape in the vehicle side view, but this is not limiting. As illustrated in FIG. 10, the independent portion 54 may be formed in a shape other than a substantial rectangle, in accordance with differences between vehicles in the protection area for the head area of a vehicle occupant. In these cases, it is desirable if the center pillar non-inflating portion 46C and the slit portion 52 are provided along portions at the outer periphery of the independent portion 54 in the vehicle side view.

Second Exemplary Embodiment

Figure 7:
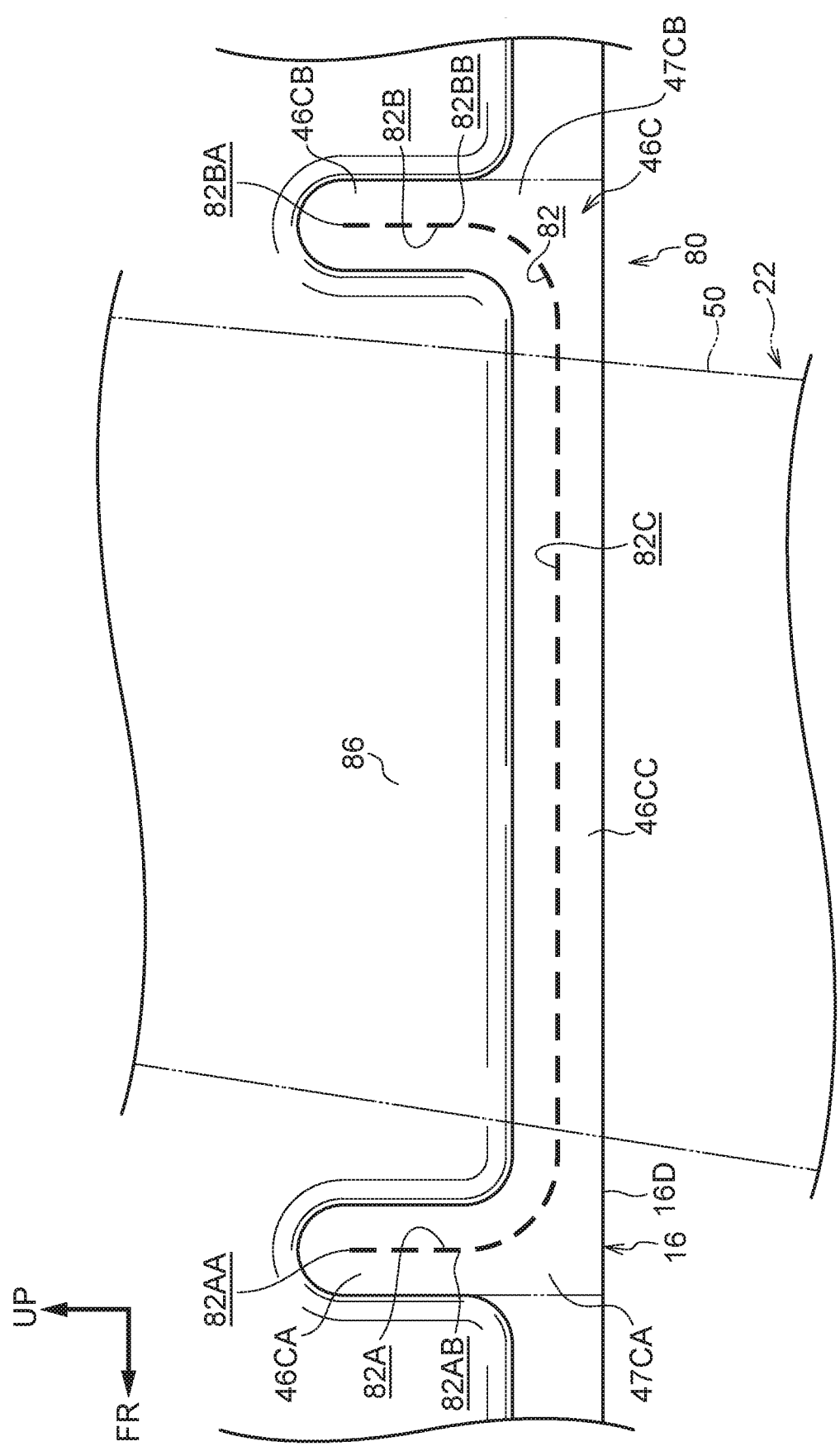
FIG. 7 is a magnified side view, corresponding with FIG. 2, showing a slit portion of a curtain airbag device for a vehicle according to a second exemplary embodiment.

Now, a curtain airbag device for a vehicle 80 according to a second exemplary embodiment of the present invention is described using FIG. 7. Structural portions that are the same as in the first exemplary embodiment described above are assigned the same reference numerals, and descriptions thereof are not given.

The curtain airbag device for a vehicle 80 according to the second exemplary embodiment is basically similar to the first exemplary embodiment but differs in that a slit portion 82 is structured by slits that are discontinuous in a direction of extension of the slit portion 82.

As shown in FIG. 7, the slit portion 82 is provided in the center pillar non-inflating portion 46C. The slit portion 82 includes a front slit 82A, a rear slit 82B, and a bottom slit 82C. The front slit 82A is provided at a substantially central portion in the vehicle front-and-rear direction of the front side non-inflating portion 46CA of the center pillar non-inflating portion 46C. The front slit 82A is formed as slits (incisions) that discontinuously extend substantially in the vehicle vertical direction at the vehicle front side of the center pillar garnish 50.

The rear slit 82B is provided at a substantially central portion in the vehicle front-and-rear direction of the rear side non-inflating portion 46CB of the center pillar non-inflating portion 46C. The rear slit 82B is formed as slits that discontinuously extend substantially in the vehicle vertical direction at the vehicle rear side of the center pillar garnish 50.

The bottom slit 82C is provided at a substantially central portion in the vehicle vertical direction of the bottom non-inflating portion 46CC of the center pillar non-inflating portion 46C. The bottom slit 82C is formed as discontinuous slits that connect a lower end portion 82AB of the front slit 82A with a lower end portion 82BB of the rear slit 82B substantially in the vehicle front-and-rear direction. According to the above structure, in the vehicle side view, the slit portion 82 is formed in a substantial "U" shape with the bottom slit 82C spanning across the center pillar garnish 50, and the slit portion 82 is structured by discontinuous slits, in other words, perforations, in the directions of extension of the slit portion 82. Therefore, at usual times, an independent portion 86 of the curtain airbag 16 that is at the inner side of the slit portion 82 is in a state of being connected with other regions of the curtain airbag 16 by portions between the discontinuous slits of the slit portion 82 (portions that are not incised). However, during inflation and deployment, the portions between the discontinuous slits of the slit portion 82 are broken by inflation pressure acting within the curtain airbag 16, and the adjacent slits link up. That is, the slit portion 82 becomes a single continuous slit, as a result of which the independent portion 86 may be displaced relative to the other regions of the curtain airbag 16 in the vehicle width direction about an axis that is an imaginary line L linking an upper end portion 82AA of the front slit 82A with an upper end portion 82BA of the rear slit 82B. As mentioned above, in the vehicle side view, the slit portion 82 extends along a substantially central portion in the vehicle vertical direction of the bottom non-inflating portion 46CC. Therefore, even when the independent portion 86 is displaced in the vehicle width direction of the curtain airbag 16 during inflation and deployment, a portion of the bottom non-inflating portion 46CC remains in a state of being integral with the first non-inflating portion 46A. As a result, tension in the curtain airbag 16 in the vehicle front-and-rear direction is maintained.

The respective upper end portions 82AA and 82BA of the front slit 82A and rear slit 82B of the slit portion 82 are disposed at the vehicle upper side relative to the shoulder belt anchor 60 of the vehicle seat 58 (see FIG. 6). That is, the respective upper end portions 82AA and 82BA of the front slit 82A and rear slit 82B are disposed at the vehicle upper side relative to the upper face 60A of the shoulder belt anchor 60.

Operation and Effects of the Second Exemplary Embodiment

Now, operation and effects of the second exemplary embodiment are described.

The structure described above has a similar structure to the curtain airbag device for a vehicle 10 according to the first exemplary embodiment apart from the slit portion 82 being structured by discontinuous slits. Thus, similar effects to the first exemplary embodiment are provided. In addition, because the slit portion 82 is formed as slits that are discontinuous in the direction of extension, the independent portion 86 and other regions of the curtain airbag 16 are in a connected state at usual times. Therefore, movement of the independent portion 86 during a folding operation when the curtain airbag 16 is being packed may be suppressed, which improves ease of operation of the folding operation. On the other hand, when expansion pressure is applied by the supply of gas to the interior of the curtain airbag 16, the portions between the slits of the slit portion 82 are broken and the slit portion 82 becomes a continuous long slit. Hence, the independent portion 86 may be relatively displaced with respect to the other regions. Therefore, both vehicle occupant restraint performance may be improved and ease of operation at a time of folding the curtain airbag 16 may be improved.

Third Exemplary Embodiment

Figure 8:
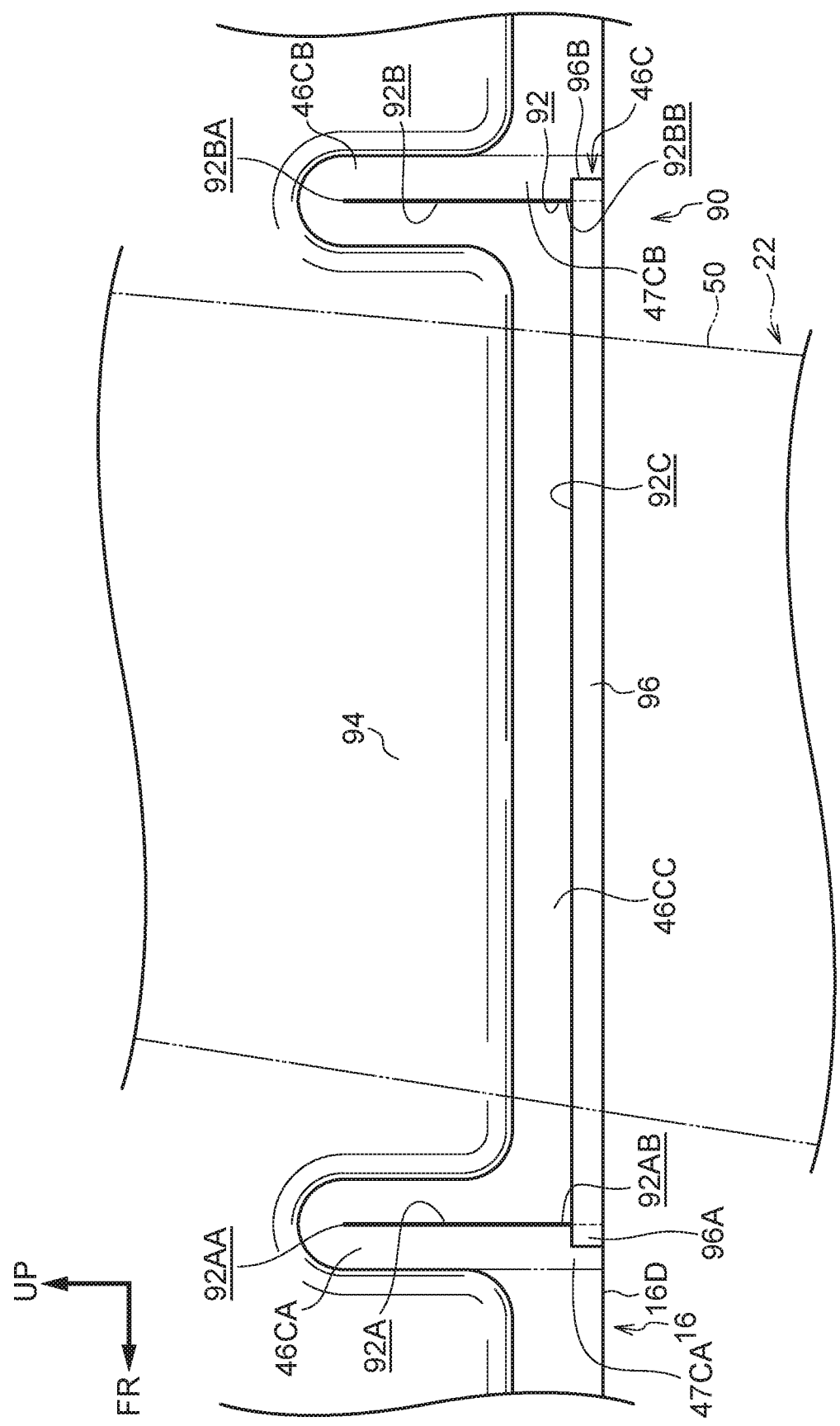
FIG. 8 is a magnified side view, corresponding with FIG. 2, showing a slit portion of a curtain airbag device for a vehicle according to a third exemplary embodiment.
Figure 9:
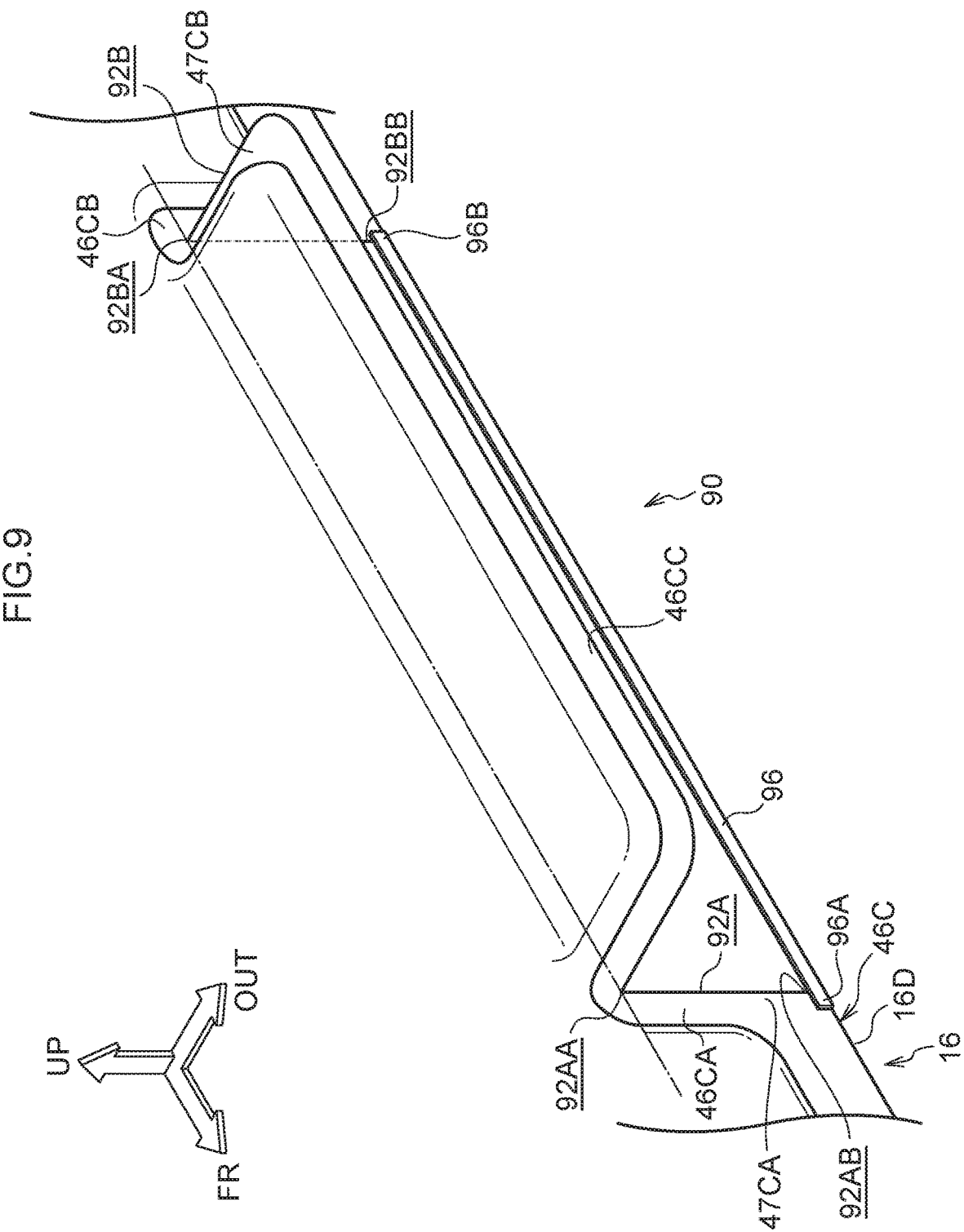
FIG. 9 is a schematic perspective view showing an example of a displaced state of an independent portion of the curtain airbag device for a vehicle according to the third exemplary embodiment.

Now, a curtain airbag device for a vehicle according to a third exemplary embodiment of the present invention is described using FIG. 8 and FIG. 9. Structural portions that are the same as in the first exemplary embodiment described above are assigned the same reference numerals, and descriptions thereof are not given.

A curtain airbag device for a vehicle 90 according to the third exemplary embodiment is basically similar to the first exemplary embodiment but differs in that a connecting member 96 that is a separate body is provided. The connecting member 96 connects the lower end portions 47CA and 47CB of the center pillar non-inflating portion 46C at, respectively, a front slit 92A at the vehicle front side and a rear slit 92B at the vehicle rear side of the center pillar non-inflating portion 46C with one another.

That is, as shown in FIG. 8, a slit portion 92 is provided at the center pillar non-inflating portion 46C. The slit portion 92 includes the front slit 92A, the rear slit 92B and a bottom slit 92C. The front slit 92A is provided at a substantially central portion in the vehicle front-and-rear direction of the front side non-inflating portion 46CA of the center pillar non-inflating portion 46C. The front slit 92A is formed as a slit (incision) extending substantially in the vehicle vertical direction at the vehicle front side of the center pillar garnish 50.

The rear slit 92B is provided at a substantially central portion in the vehicle front-and-rear direction of the rear side non-inflating portion 46CB of the center pillar non-inflating portion 46C. The rear slit 92B is formed as a slit extending substantially in the vehicle vertical direction at the vehicle rear side of the center pillar garnish 50.

The bottom slit 92C is provided at the vehicle lower side of the bottom non-inflating portion 46CC of the center pillar non-inflating portion 46C. The bottom slit 92C extends substantially in the vehicle front-and-rear direction between a lower end portion 92AB of the front slit 92A and a lower end portion 92BB of the rear slit 92B. The bottom slit 92C is spaced from the connecting member 96 to be separable therefrom.

That is, the bottom non-inflating portion 46CC is structured such that the vehicle lower side thereof overlaps with the connecting member 96. The connecting member 96 is a separate body from the curtain airbag 16 but is constituted of the same base fabric as the curtain airbag 16. In side view, the connecting member 96 is formed in a substantially rectangular shape whose longer direction is in the vehicle front-and-rear direction. A front end portion 96A of the connecting member 96 is joined by sewing, adhesion or the like, which is not shown in the drawings, to a portion of the bottom non-inflating portion 46CC that corresponds with the lower end portion 92AB of the front slit 92A. A rear end portion 96B of the connecting member 96 is joined by sewing, adhesion or the like, which is not shown in the drawings, to a portion of the bottom non-inflating portion 46CC that corresponds with the lower end portion 92BB of the rear slit 92B.

For the structure described above, respective incisions that will be in the vehicle vertical direction at a time of inflation and deployment are formed from the lower edge portion 16D of the curtain airbag 16 in each of the front side non-inflating portion 46CA and the rear side non-inflating portion 46CB. Thus, the front slit 92A and the rear slit 92B are formed. Subsequently, the respective lower end portions 47CA and 47CB of the front side non-inflating portion 46CA at the vehicle front side of the front slit 92A and the rear side non-inflating portion 46CB at the vehicle rear side of the rear slit 92B are connected with one another substantially in the vehicle front-and-rear direction by the connecting member 96. As a result, the bottom slit 92C extends substantially in the vehicle front-and-rear direction between the lower end portion 92AB of the front slit 92A and the lower end portion 92BB of the rear slit 92B.

According to the above structure, in the vehicle side view, the slit portion 92 is formed in a substantial "U" shape with the bottom slit 92C spanning across the center pillar garnish 50. During inflation and deployment, inflation pressure inside the curtain airbag 16 is applied to an independent portion 94 that is a region of the curtain airbag 16 at the inner side of the slit portion 92. Consequently, as shown in FIG. 9, the independent portion 94 may be displaced to the vehicle width direction outer side relative to other regions of the curtain airbag 16, about an axis that is an imaginary line L linking an upper end portion 92AA of the front slit 92A with an upper end portion 92BA of the rear slit 92B. Because the respective lower end portions 47CA and 47CB of the center pillar non-inflating portion 46C at the vehicle front side of the front slit 92A and the vehicle rear side of the rear slit 92B are connected with one another substantially in the vehicle front-and-rear direction by the connecting member 96, even when the independent portion 94 is displaced in the vehicle width direction, tension in the curtain airbag 16 in the vehicle front-and-rear direction is maintained.

The respective upper end portions 92AA and 92BA of the front slit 92A and rear slit 92B of the slit portion 92 are disposed at the vehicle upper side relative to the shoulder belt anchor 60 of the vehicle seat 58 (see FIG. 6). That is, the respective upper end portions 92AA and 92BA of the front slit 92A and rear slit 92B are disposed at the vehicle upper side relative to the upper face 60A of the shoulder belt anchor 60.

Operation and Effects of the Third Exemplary Embodiment

Now, operation and effects of the third exemplary embodiment are described.

The structure described above has a similar structure to the curtain airbag device for a vehicle 10 according to the first exemplary embodiment apart from the connecting member 96 being provided at the vehicle lower side of the bottom slit 92C of the slit portion 92. Thus, similar effects to the first exemplary embodiment are provided. In addition, the connecting member 96 that is a separate body is provided at the vehicle lower side of the center pillar non-inflating portion 46C, and the connecting member 96 connects the respective lower end portions 47CA and 47CB of the center pillar non-inflating portion 46C at the vehicle front side of the front slit 92A and the vehicle rear side of the rear slit 92B with one another. Accordingly, both tension in the curtain airbag 16 in the vehicle front-and-rear direction is maintained at a time of inflation and deployment and relative displacement of the independent portion 94 is enabled. Because the connecting member 96 is formed as a separate body, it is easy to take measures to maintain the connected state even if the tension in the curtain airbag 16 in the vehicle front-and-rear direction is large at the time of inflation and deployment, by increasing a thickness of the connecting member 96, increasing join strengths between the lower end portions 47CA and 47CB and the connecting member 96, or the like. This may contribute to maintaining deployment consistency, restraint performance and the like of the curtain airbag 16.

In the first to third exemplary embodiments described above, the vehicle seat 58 is provided with the shoulder belt anchor 60 that is exposed at the shoulder aperture 58AA at the vehicle width direction outer side of the seat back 58A, but this is not limiting. A structure in which the shoulder belt anchor 60 or an alternative member is incorporated may be formed at the shoulder aperture 58AA of the seat back 58A. In the vehicle side view, the respective upper end portions 52AA and 52BA, 82AA and 82BA, or 92AA and 92BA of the front slit 52A, 82A or 92A and rear slit 52B, 82B or 92B of the slit portion 52, 82 or 92 may be disposed at the vehicle upper side relative to the shoulder aperture 58AA at the vehicle width direction outer side of the seat back 58A in which the shoulder belt anchor 60 or the like is incorporated. Therefore, if the curtain airbag 16 inflates and expands in the comfortable state and the independent portion 54, 86 or 94 abuts against the shoulder aperture 58AA of the seat back 58A, the independent portion 54, 86 or 94 may inflect to the vehicle width direction outer side and an amount of interference between the independent portion 54, 86 or 94 and the shoulder aperture 58AA may be reduced.

In these structures, because the curtain airbag 16 is outward roll-folded, the independent portion 54, 86 or 94 inflects to the vehicle width direction outer side when the independent portion 54, 86 or 94 abuts against the shoulder belt anchor 60 during inflation and deployment, but this is not limiting. Structures in which the independent portion inflects to the vehicle width direction inner side are possible, and structures in which the independent portion is compressed in the vehicle vertical direction are possible.

Hereabove, exemplary embodiments of the present invention have been described. The present invention is not limited by these descriptions, and it will be clear that numerous modifications outside of these descriptions may be embodied within a technical scope not departing from the gist of the invention.

What is claimed is:

1. A curtain airbag device for a vehicle, comprising:
  a curtain airbag including:
    an inflating portion that, in a case in which an inflator activates at a time of vehicle collision and supplies gas into the inflating portion, is inflated and deployed toward a vehicle lower side from an end portion of a vehicle width direction outer side of a ceiling, and
    a center pillar non-inflating portion that is provided at a vehicle lower side of a region of the inflating portion that overlaps, in a vehicle side view, with a center pillar garnish in a case in which the inflating portion is inflated and deployed, the center pillar non-inflating portion spanning across the center pillar garnish and not being inflated and deployed in a case in which gas is supplied from the inflator; and
  a slit portion provided at the center pillar non-inflating portion, the slit portion including:
    a front slit that extends substantially in a vehicle vertical direction at a vehicle front side of the center pillar garnish,
    a rear slit that extends substantially in the vehicle vertical direction at a vehicle rear side of the center pillar garnish, and
    a bottom slit that extends substantially in a vehicle front-rear direction, wherein:
  between respective lower end portions of the front slit and the rear slit, the slit portion is formed substantially in a "U" shape that opens toward a vehicle upper side in the vehicle side view, and
  where the slit portion and the inflating portion overlap in the vehicle front-rear direction, the slit portion is disposed below the inflating portion in the vehicle vertical direction such that the inflating portion is not below the slit portion in the vehicle vertical direction.

2. The curtain airbag device according to claim 1, wherein:
  the center pillar non-inflating portion includes:
    a front side non-inflating portion that extends substantially in the vehicle vertical direction, the front side non-inflating portion protruding toward the inflating portion from a lower end of the curtain airbag at the vehicle front side of the center pillar garnish,
    a rear side non-inflating portion that extends substantially in the vehicle vertical direction, the rear side non-inflating portion protruding toward the inflating portion from the lower end of the curtain airbag at the vehicle rear side of the center pillar garnish, and
    a bottom non-inflating portion that extends substantially in the vehicle front-rear direction between respective lower end portions of the front side non-inflating portion and the rear side non-inflating portion;
  the front slit is formed at the front side non-inflating portion, the rear slit is formed at the rear side non-inflating portion, and the bottom slit is formed at the bottom non-inflating portion; and
  the curtain airbag includes an independent portion that includes the inflating portion that is surrounded by the front slit, the rear slit and the bottom slit.

3. The curtain airbag device according to claim 1, wherein, during inflation and deployment of the curtain airbag, respective upper end portions of the front slit and the rear slit of the slit portion are disposed at the vehicle upper side in the vehicle side view relative to a shoulder aperture at a vehicle width direction outer side of a seat back of a vehicle seat.

4. The curtain airbag device according to claim 1, wherein, during inflation and deployment of the curtain airbag, respective upper end portions of the front slit and the rear slit of the slit portion are disposed at the vehicle upper side in the vehicle side view relative to a shoulder belt anchor that is provided and exposed at a shoulder aperture at a vehicle width direction outer side of a seat back of a vehicle seat.

5. The curtain airbag device according to claim 1, wherein the slit portion is discontinuous in a direction of extension of the slit portion.

6. The curtain airbag device according to claim 1, further comprising a connecting member that is a separate body at a vehicle lower side of the center pillar non-inflating portion, the connecting member connecting respective lower end portions of the center pillar non-inflating portion at the vehicle front side of the front slit and the vehicle rear side of the rear slit with one another substantially in the vehicle front-rear direction.

7. A curtain airbag device for a vehicle, comprising:
  a curtain airbag including:
    an inflating portion that, in a case in which an inflator activates at a time of vehicle collision and supplies gas into the inflating portion, is inflated and deployed toward a vehicle lower side from an end portion of a vehicle width direction outer side of a ceiling, and
    a center pillar non-inflating portion that is provided at a vehicle lower side of a region of the inflating portion that overlaps, in a vehicle side view, with a center pillar garnish in a case in which the inflating portion is inflated and deployed, the center pillar non-inflating portion spanning across the center pillar garnish and not being inflated and deployed in a case in which gas is supplied from the inflator; and
  a slit portion provided at the center pillar non-inflating portion, the slit portion including:
    a front slit that extends substantially in a vehicle vertical direction at a vehicle front side of the center pillar garnish,
    a rear slit that extends substantially in the vehicle vertical direction at a vehicle rear side of the center pillar garnish, and
    a bottom slit that extends substantially in a vehicle front-rear direction,
  between respective lower end portions of the front slit and the rear slit, the slit portion being formed substantially in a "U" shape that opens toward a vehicle upper side in the vehicle side view, and
  during inflation and deployment of the curtain airbag, respective upper end portions of the front slit and the rear slit of the slit portion being disposed at the vehicle upper side in the vehicle side view relative to a shoulder aperture at a vehicle width direction outer side of a seat back of a vehicle seat.

8. The curtain airbag device according to claim 7, wherein, during inflation and deployment of the curtain airbag, respective upper end portions of the front slit and the rear slit of the slit portion are disposed at the vehicle upper side in the vehicle side view relative to a shoulder belt anchor that is provided and exposed at the shoulder aperture at the vehicle width direction outer side of the seat back of the vehicle seat.

9. A curtain airbag device for a vehicle, comprising:
  a curtain airbag including:
    an inflating portion that, in a case in which an inflator activates at a time of vehicle collision and supplies gas into the inflating portion, is inflated and deployed toward a vehicle lower side from an end portion of a vehicle width direction outer side of a ceiling, and
    a center pillar non-inflating portion that is provided at a vehicle lower side of a region of the inflating portion that overlaps, in a vehicle side view, with a center pillar garnish in a case in which the inflating portion is inflated and deployed, the center pillar non-inflating portion spanning across the center pillar garnish and not being inflated and deployed in a case in which gas is supplied from the inflator; and
  a slit portion provided at the center pillar non-inflating portion, the slit portion including:
    a front slit that extends substantially in a vehicle vertical direction at a vehicle front side of the center pillar garnish,
    a rear slit that extends substantially in the vehicle vertical direction at a vehicle rear side of the center pillar garnish, and
    a bottom slit that extends substantially in a vehicle front-rear direction,
  between respective lower end portions of the front slit and the rear slit, the slit portion being formed substantially in a "U" shape that opens toward a vehicle upper side in the vehicle side view, and
  the slit portion being discontinuous in a direction of extension of the slit portion.

\* \* \* \* \*